Patented Dec. 8, 1936

2,063,144

UNITED STATES PATENT OFFICE 2,063,144

ETHER ALCOHOL ESTERS OF ALICYCLIC CARBOXYLIC ACIDS

Harold J. Barrett, Wilmington, and Emmette F. Izard, Elsmere, Del., assignors to E. I. du Pont de Nemours & Company, Wilmington, Del., a corporation of Delaware No Drawing. Application August 6, 1932, Serial No. 627,812

10 Claims. (Cl. 260—54)

This invention relates to new chemical compounds and compositions containing same, and more particularly, to ether alcohol esters of alicyclic acids and cellulose derivative compositions containing same.

An object of the present invention is to provide ether alcohol esters of alicyclic acids. Another object is to provide a simple process of preparing such esters. A further object is to provide plastic and coating compositions containing cellulose derivatives and ether alcohol esters of alicyclic acids. Other objects of the invention will be apparent from the description given hereinafter.

The above objects are accomplished according to the present invention by reacting an ether alcohol with an alicyclic acid and removing the water formed by said reaction from the reaction zone and isolating the resulting ester.

Instead of preparing the ester as above, equivalent methods may be used, such as the use of the acid anhydride in place of the acid, by reacting the chloride of the acid with the ether alcohol, or by reacting esters of the acid with more volatile alcohols with the ether alcohol. Also, the esters may be obtained by reacting a sodium salt of the alicyclic acid with a halide of the ether alcohol, or by reacting an ester of an unsaturated acid, such as maleic or acrylic esters, with conjugated dienes such as butadiene or chloroprene. Catalysts such as sulphuric acid are preferably used to promote the reaction, and the removal of water formed by the reaction is preferably assisted by the use of ethylene dichloride, benzene, xylene, or similar solvents.

The following examples are given to illustrate the preparation of esters coming within the scope of the present invention:

Example 1.—Methoxyethyl 4 - chloro - 1,2,3,6-tetrahydrophthalate:—A mixture containing 205 grams of 4-chloro-1,2,3,6-tetrahydrophthalic acid 200 grams methoxyethanol, 200 grams ethylene dichloride, and 2 grams sulphuric acid was heated to boiling in an apparatus designed to separate the water from the distillate and to return the ethylene dichloride distilled off back to the reaction flask. Distillation was continued until the theoretical amount of water was removed and the acid number reduced to a very low figure. The product was washed with sodium carbonate solution to remove acid and then vacuum distilled. The product distills at from 212–220° C. at 10 mm. pressure.

Example 2.—Methoxyethyl hexahydrophthalate:—A mixture containing 105 grams hexahydrophthalic acid, 175 grams methoxyethanol, 100 grams ethylene dichloride, and 2 grams sulphuric acid was heated to boiling in an apparatus such as described in Example 1. Esterification and purification were then carried out as in Example 1. The product distills at from 195–205° C. at 10 mm. pressure.

Example 3.—Butoxyethyl endoxotetrahydrohemimellitate:—A mixture of 106 grams butoxyethyl furoate and 150 grams butoxyethyl maleate was heated at 110° C. continuously for a week. When the reaction product was submitted to vacuum distillation, a small amount of material could be distilled but most of the product could not be distilled. This residual product was decolorized by treatment with carbon. The product obtained was the butoxyethyl ester of endoxotetrahydrohemimellitic acid having the formula—

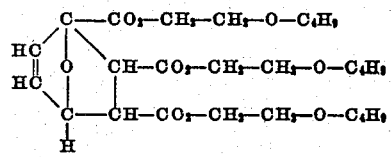

Example 4.—Butoxyethyl 4-chloro-1,2,3,6-tetrahydrophthalate:—A mixture containing 106 grams butoxyethyl maleate and 75 grams chloroprene was heated to 50° C. and allowed to stand overnight. Distillation of the product yielded butoxyethyl 4-chloro-1,2,3,6-tetrahydrophthalate.

Example 5.—Phenoxyethoxyethyl tetrahydrophthalate:—A mixture of 15 grams tetrahydrophthalic acid and 30 grams phenoxyethoxyethanol was refluxed until esterification was complete. The resulting product was decolorized by treatment with carbon. The product was phenoxyethoxyethyl tetrahydrophthalate.

Example 6.—Methoxyethyl camphorate:—A mixture containing 200 grams camphoric acid, 175 grams methoxyethanol, 200 grams ethylene dichloride, and 2 grams sulphuric acid was heated to boiling in an apparatus such as described in Example 1. The finished product, prepared in accordance with Example 1, distilled at 210–215° C. at 10 mm. pressure.

The above examples merely show specific methods of preparing the esters of the present invention, which may be made according to other methods. For example, certain of these esters may even be made by hydrogenating the ester of the corresponding aromatic acid by means of nickel catalysts at 120–150° C. under moderate pressures, e. g., 30–40 atmospheres hydrogen pressure. In this manner may be prepared methoxyethyl hexahydrophthalate, ethoxyethyl hexahydrobenzoate, butoxyethyl hexahydrophenylacetate, benzyloxyethyl hexahydronaphthoate, tolyloxyethyl hexadroterephthalate, ethoxyethyl hexahydrosalicylate, butoxyethyl 5,6,7,8-tetrahydro-2,3-hydroxynaphthoate, dibenzylin 5,6,7,8-tetrahydro-2,3-aminonaphthoate.

The compounds coming within the scope of this invention comprise the ether alcohol esters of organic carboxylic acids containing from 1-2 carbocyclic rings, inclusive, at least one of which is alicyclic, i. e., non-benzenoid. The alicyclic ring need not be fully saturated but may contain one or two double bonds. Among the alicyclic acids, suitable for use in this invention and not heretofore disclosed, may be mentioned: chaulmoogric acid, hydrocarpic acid, cyclohexylacetic, hexahydro-p-toluic, cyclopentanecarboxylic, dihydronaphthoic, 4-phenyl-hexahydrobenzoic, isocamphoric, dodecahydrodiphenic, and hexahydrosalicyclic acids. Other acids suitable for use in this invention are those disclosed in British patents 300,130; 324,661; 325,669; German patents 500,160; 502,043; and French patent 672,025.

The term "ether alcohol" as used herein may be designated by the formula $(RO)_x R' OH$, in which R is a monovalent organic radical either (a) aliphatic from methyl to stearyl, (b) alicyclic, such as cyclohexyl, methylcyclohexyl, cyclohexylmethyl, etc., (c) aralkyl, such as benzyl, (d) aryl, such as phenyl, cresyl, etc., or (e) heterocyclic, such as furyl, piperidyl, etc.; R' is a polyvalent organic radical derived from glycols, polyglycols, glycerol, polyglycerols, sorbitol, erythritol, et cetera, and $x$ is a whole number. Among the ether alcohols suitable for use in the present invention, not heretofore disclosed, may be mentioned: benzyloxyethanol, 2-phenoxypropanol, triethyl ether of pentaerythritol, ethoxyethoxyethanol, monobenzylin (monobenzyl ether of glycerol), as well as cyclic ether alcohols such as tetrahydrofurfuryl alcohol.

The esters of the present invention are liquids varying from water white to light amber in color and are high boiling and compatible with cellulose derivatives. In view of their solubility in ordinary lacquer solvents, they are well suited for use as plasticizers in cellulose derivative compositions.

The esters may be used with cellulose nitrate, cellulose acetate, ethyl cellulose, cellulose propionate, cellulose butyrate, cellulose acetobutyrate, cellulose acetopropionate, cellulose nitroacetate, benzyl cellulose, and the like, with or without other heretofore known plasticizers, such as triacetin, camphor, dibutyl phthalate, tricresyl phosphate, and the like. They may be used with resins such as damar, ester gum, and other natural and synthetic resins. The compositions may be used with or without oils, pigments, and the like, in the preparation of lacquers, plastic compositions, and the like. They are of particular value as plasticizers for cellulose derivatives because of their high boiling point, water resistance, and compatibility, particularly with cellulose acetate. With cellulose derivatives they give permanently flexible products having good durability.

Certain of the esters, e. g., the ether alcohol esters of chaulmoogric and hydrocarpic acids may also be used in the treatment of disease.

As many apparently widely different embodiments of this invention may be made without departing from the spirit and scope thereof, it is to be understood that the invention is not limited to the specific embodiments thereof except as defined in the appended claims.

We claim:

1. An ether alcohol ester of an alicyclic carboxylic acid containing only one carbocyclic ring, wherein the ether alcohol is an ether of a polyhydric alcohol of the class consisting of glycols, polyglycols, glycerol and polyglycerols, said ether containing at least one unetherified hydroxyl group.

2. An ether alcohol ester of an alicyclic acid from the group consisting of tetrahydrophthalic, hexahydrophthalic, endoxotetrahydrohemimellitic, and camphoric acids.

3. An ether alcohol ester of an alicyclic acid from the group consisting of tetrahydrophthalic, hexahydrophthalic, endoxotetrahydrohemimellitic, and camphoric acids, wherein the ether alcohol is an ether of a polyhydric alcohol of the class consisting of glycols, polyglycols, glycerol and polyglycerols, said ether containing at least one unetherified hydroxyl group.

4. An ether alcohol ester of an alicyclic acid from the group consisting of tetrahydrophthalic, hexahydrophthalic, endoxotetrahydrohemimellitic, and camphoric acids, wherein the ether alcohol has the formula—

$$RO\cdot CH_2\cdot CH_2\cdot OH,$$

in which R is the radical of a monohydric aliphatic alcohol. 

5. An ether alcohol ester of an alicyclic acid from the group consisting of tetrahydrophthalic, hexahydrophthalic, endoxotetrahydrohemimellitic, and camphoric acids, wherein the ether alcohol has the formula—

$$RO\cdot CH_2\cdot CH_2\cdot OH,$$

in which R is the radical of a monohydric aliphatic alcohol. 

6. Methoxyethyl hexahydrophthalate.

7. Methoxyethyl 4-chloro-1,2,3,6-tetrahydrophthalate.

8. Butoxyethyl endoxotetrahydrohemimellitate.

9. An ether alcohol ester of an alicyclic polycarboxylic acid of the formula—

$$R(COOH)_x$$

where $x$ is a whole number greater than one and R is an alicyclic hydrocarbon ring, wherein the ether alcohol is an ether of a polyhydric alcohol of the class consisting of glycols, polyglycols, glycerol and polyglycerols, said ether containing at least one unetherified hydroxyl group. 

10. An ether alcohol ester of an alicyclic polycarboxylic acid of the formula—

$$R(COOH)_x$$

where $x$ is a whole number greater than one and R is an alicyclic hydrocarbon ring, wherein the ether alcohol is a monoether of a glycol. 

HAROLD J. BARRETT.
EMMETTE F. IZARD.

CERTIFICATE OF CORRECTION.

Patent No. 2,063,144.

December 8, 1936.

HAROLD J. BARRETT, ET AL.

It is hereby certified that error appears in the printed specification of the above numbered patent requiring correction as follows: Page 1, first column, line 28, for "alcahol" read alcohol; page 2, first column, line 4, for "hexadroterephthalate" read hexahydroterephthalate; same column, line 17, and second column, line 1, for "hydrocarpic" read hydnocarpic; and that the said Letters Patent should be read with these corrections therein that the same may conform to the record of the case in the Patent Office.

Signed and sealed this 9th day of March, A. D. 1937.

(Seal)

Henry Van Arsdale
Acting Commissioner of Patents.